(12) United States Patent
Takahashi

(10) Patent No.: US 9,426,317 B2
(45) Date of Patent: Aug. 23, 2016

(54) PRINTING APPARATUS, METHOD FOR CONTROLLING PRINTING APPARATUS, AND STORAGE MEDIUM

(71) Applicant: CANON KABUSHIKI KAISHA, Tokyo (JP)

(72) Inventor: Toru Takahashi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/606,782

(22) Filed: Jan. 27, 2015

(65) Prior Publication Data

US 2015/0215488 A1 Jul. 30, 2015

(30) Foreign Application Priority Data

Jan. 29, 2014 (JP) .................................. 2014-013958

(51) Int. Cl.
*H04N 1/04* (2006.01)
*H04N 1/00* (2006.01)

(52) U.S. Cl.
CPC .................................. *H04N 1/00631* (2013.01)

(58) Field of Classification Search
CPC ........................................................ H04N 1/12
USPC ................................ 358/498, 496, 296, 1.13
See application file for complete search history.

(56) References Cited

U.S. PATENT DOCUMENTS

2005/0231772 A1* 10/2005 Kitaoka et al. ................ 358/498
2006/0285901 A1* 12/2006 Ootsuka et al. ............... 399/367

FOREIGN PATENT DOCUMENTS

JP 2000-185881 A 7/2000

\* cited by examiner

*Primary Examiner* — Cheukfan Lee
(74) *Attorney, Agent, or Firm* — Canon USA, Inc. IP Division

(57) ABSTRACT

An original and print paper are output to the same printout destination so as to be easily combined. A method includes setting whether the original is output to a paper ejecting unit for the print paper and performing control so that the original is output to the paper ejecting unit for the print paper if setting that causes the original to be output to a first paper ejecting unit that is the same as the paper ejecting unit for the print paper is made in the setting and performing control so that the original is output to a second paper ejecting unit that differs from the paper ejecting unit for the print paper if setting that causes the original to be output to a paper ejecting unit that is the same as the paper ejecting unit for the print paper is not made in the setting.

12 Claims, 14 Drawing Sheets

PRINTING APPARATUS, METHOD FOR CONTROLLING PRINTING APPARATUS, AND STORAGE MEDIUM

BACKGROUND OF THE INVENTION

1. Field of the Invention

The present invention relates to a printing apparatus, a method for controlling printing apparatus, and a storage medium.

2. Description of the Related Art

Printing apparatuses including an image reader that automatically conveys an original and reads out the image of the conveyed original have been developed. Such printing apparatuses have a sheet conveying path for the original and a sheet conveying path for a print sheet that are separated from each other.

In addition, to reduce the body size of the apparatus, some printing apparatuses has a sheet conveying path shared by both an original and a print sheet (refer to, for example, Japanese Patent Laid-Open No. 2000-185881).

However, in the printing apparatus described in Japanese Patent Laid-Open No. 2000-185881, the destination of the original differs from the destination of the print sheet. Accordingly, an output material in which the original and the print sheet are combined cannot be generated.

In particular, if a group sort feature for consecutively outputting the specified number of copies of each page all together is selected and a user wants to merge the original with the print sheets, a user needs to search for an appropriate separation point of the print sheets and insert the original into the point, which is troublesome.

SUMMARY OF THE INVENTION

The present invention provides a printing apparatus for address the above-described issue.

According to an aspect of the present invention, a printing apparatus for reading out an image of an original and printing the readout image on print paper is provided. The apparatus includes a setting unit configured to set whether the original is output to a paper ejecting unit for the print paper, and a control unit configured to perform control so that the original is output to the paper ejecting unit for the print paper if setting that causes the original to be output to a first paper ejecting unit that is the same as the paper ejecting unit for the print paper is made by the setting unit and perform control so that the original is output to a second paper ejecting unit that differs from the paper ejecting unit for the print paper if setting that causes the original to be output to a paper ejecting unit that is the same as the paper ejecting unit for the print paper is not made by the setting unit.

Further features of the present invention will become apparent from the following description of exemplary embodiments with reference to the attached drawings.

DESCRIPTION OF THE EMBODIMENTS

Figure 1:
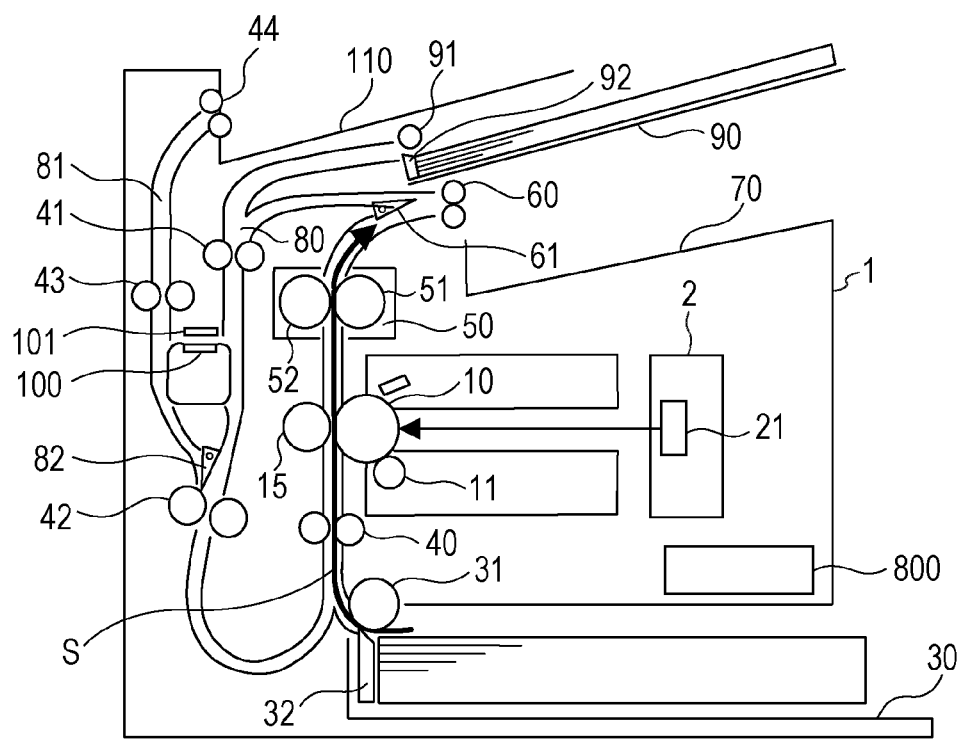
FIG. 1 is a cross-sectional view illustrating the configuration of a printing apparatus.

Exemplary embodiments of the present invention are described below with reference to the accompanying drawings.

Description of System Configuration

First Exemplary Embodiment

FIGS. 1 to 7 are cross-sectional views illustrating the configuration of a printing apparatus according to the present exemplary embodiment. The present exemplary embodiment is described below with reference to a printing apparatus including a first paper output tray 110 onto which an original sheet (also simply referred to as an "original") conveyed through a first sheet conveying path is output and a second paper output tray 70 onto which print sheets (also referred to as "print paper") conveyed through a second sheet conveying path is output. In addition, in the printing apparatus according to the present exemplary embodiment, the original sheets conveyed along the sheet conveying path for conveying the original sheets can be led to the second sheet conveying path via a shared sheet conveying path. As used herein, the term "shared sheet conveying path" refers to a sheet conveying path extending between a pair of conveying rollers 42 and the pair of conveying rollers 40.

As illustrated in FIGS. 1 to 7, a rotatable photoconductive drum 10 serving as an image bearing member and a developing roller 11 that is disposed parallel to the photoconductive drum 10 and that rotates while maintaining toner are disposed in the middle of the printing apparatus 1. Upon receiving a print signal, a light emitting unit 21 disposed in an optical unit 2 emits a laser beam onto a surface of the photoconductive drum 10 that is rotating. Thus, a latent image is formed on the surface of the photoconductive drum 10 having the laser beam emitted thereonto. If the developing roller 11 rotates and supplies retained toner to the latent image formed on the surface of the photoconductive drum 10, a toner image is formed on the surface of the photoconductive drum 10.

At that time, sheets S stored in a first paper feeding unit 30 is conveyed to the conveying rollers 40 by a pickup roller 31 and a separating unit 32 one by one. The conveying rollers 40 conveys the sheet S to a transfer unit 15 so that the toner image formed on the surface of the photoconductive drum 10 is positioned at the leading edge position of the sheet S.

The toner image conveyed to the transfer unit 15 by the rotation of the photoconductive drum 10 is transferred to the sheet S by an applied bias and a pressure provided to the transfer unit 15. Thereafter, the transfer unit 15 conveys the sheet S to the fixing unit 50. In the fixing unit 50, the toner image is fixed to the sheet S by the heat applied from a rotatable heat pressure roller 51 and the pressure of a rotatable heat pressure roller 52 that faces the heat pressure roller 51. The sheet S having the toner image fixed thereto is conveyed to the discharge rollers 60. In the case of simplex printing, the discharge rollers 60 directly conveys the sheet S to the outside of the apparatus body, and the sheet S is stacked on the second paper output tray 70. In this manner, the printout is generated. Note that the constituent elements of the printing apparatus 1 are controlled by a control unit 800 illustrated in FIG. 8.

Figure 2:
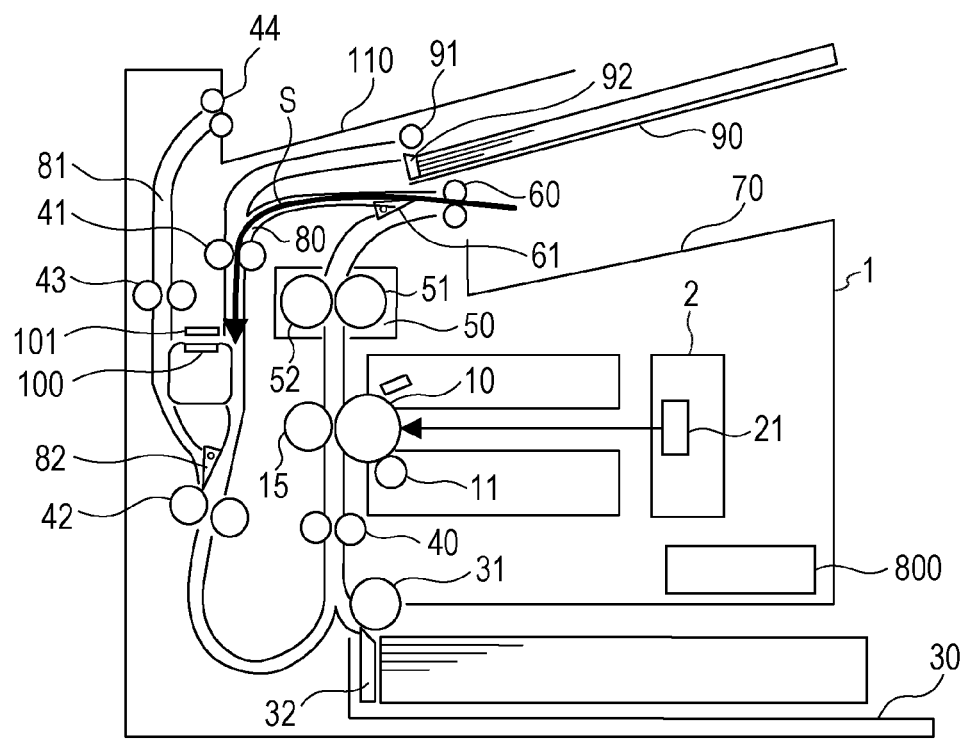
FIG. 2 is a cross-sectional view illustrating the configuration of the printing apparatus.

As illustrated in FIG. 2, in a duplex printing process, after the trailing edge of the sheet S passes beyond a duplex flapper 61, the duplex flapper 61 switches between the sheet conveying paths. Thereafter, the discharge rollers 60 rotate in the reverse direction and convey the sheet S into the sheet conveying path 80. The switched-back sheet S is conveyed to an image reader 100 via a pair of conveying rollers 41. Subsequently, the sheet S is conveyed to the transfer unit 15 by the conveying rollers 42 and the conveying rollers 40 again. The toner image is transferred and fixed to the sheet S and, thereafter, the sheet S is stacked on the second paper output tray 70.

A reading process for reading original information and a duplex printing process performed on a sheet are described below.

Figure 3:
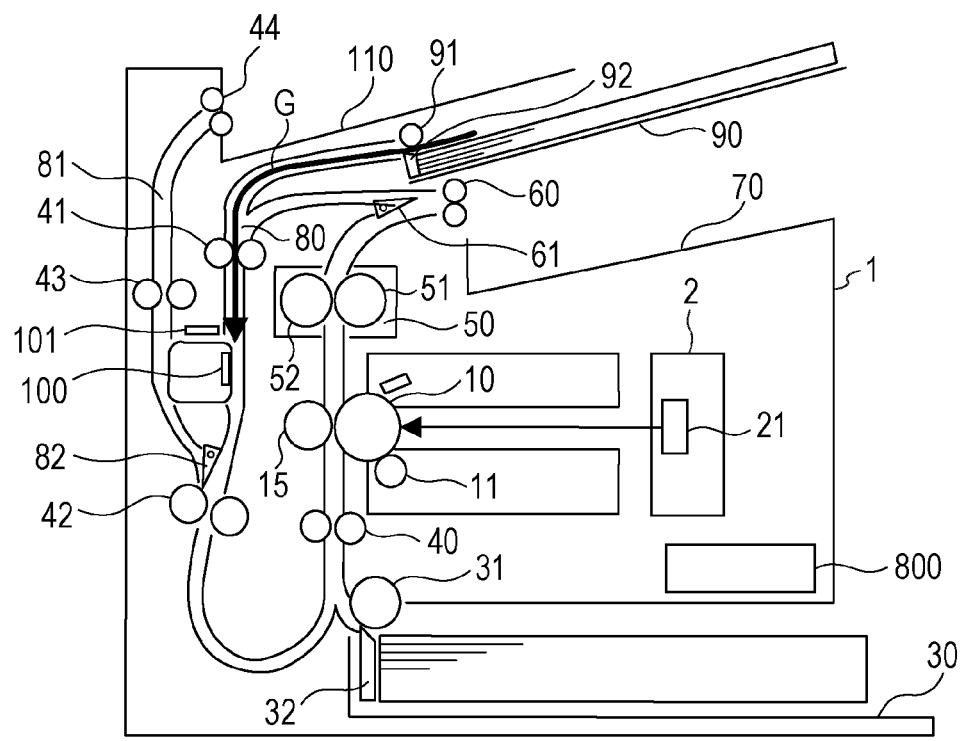
FIG. 3 is a cross-sectional view illustrating the configuration of the printing apparatus.

As illustrated in FIG. 3, when the reading process for reading out the surface of an original is started, an original G stored in a second paper feeding unit 90 are conveyed to the conveying roller 41 by a pickup roller 91 and a separating unit 92 one by one. In contrast, before reading a first surface of the original G fed from the second paper feeding unit 90, the image reader 100 emits light to a white reference member 101 and corrects a white reference value. Thereafter, the image reader 100 rotates to a position at which the image reader 100 faces the sheet conveying path 80. The conveying rollers 41 convey the original G to the image reader 100. The image reader 100 is already located at the position so as to face the sheet conveying path 80. The information read out by the image reader 100 is stored in an image memory 804 (described in more detail below with reference to FIG. 8) as the information regarding the first surface of the original. Note that the white reference member 101 is disposed face down so that dirt and dust are not deposited thereon.

Figure 4:
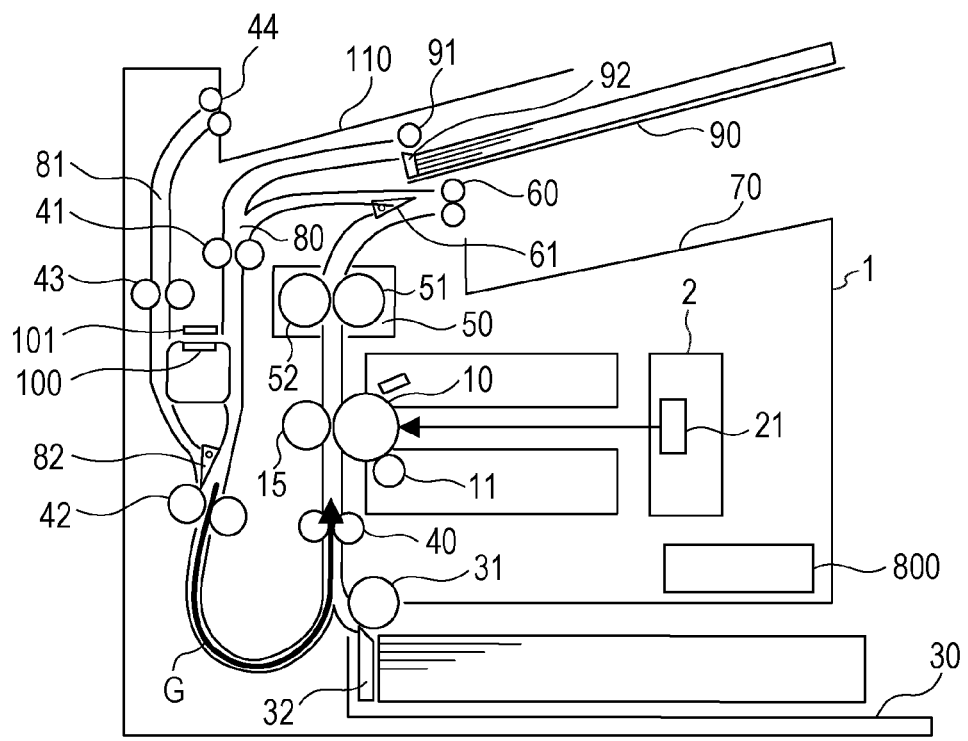
FIG. 4 is a cross-sectional view illustrating the configuration of the printing apparatus.

As illustrated in FIG. 4, when reading of the first surface, which is a front surface of the original, is completed, the original G that has passed beyond the image reader 100 is conveyed to the conveying rollers 42. The conveying rollers 42 stop when the trailing edge of the original G passes beyond a switchback flapper 82. Accordingly, the original G stops and, at that time, is pinched by the conveying rollers 42. After a predetermined period of time elapses, the original G is conveyed to a sheet conveying path 81.

Figure 5:
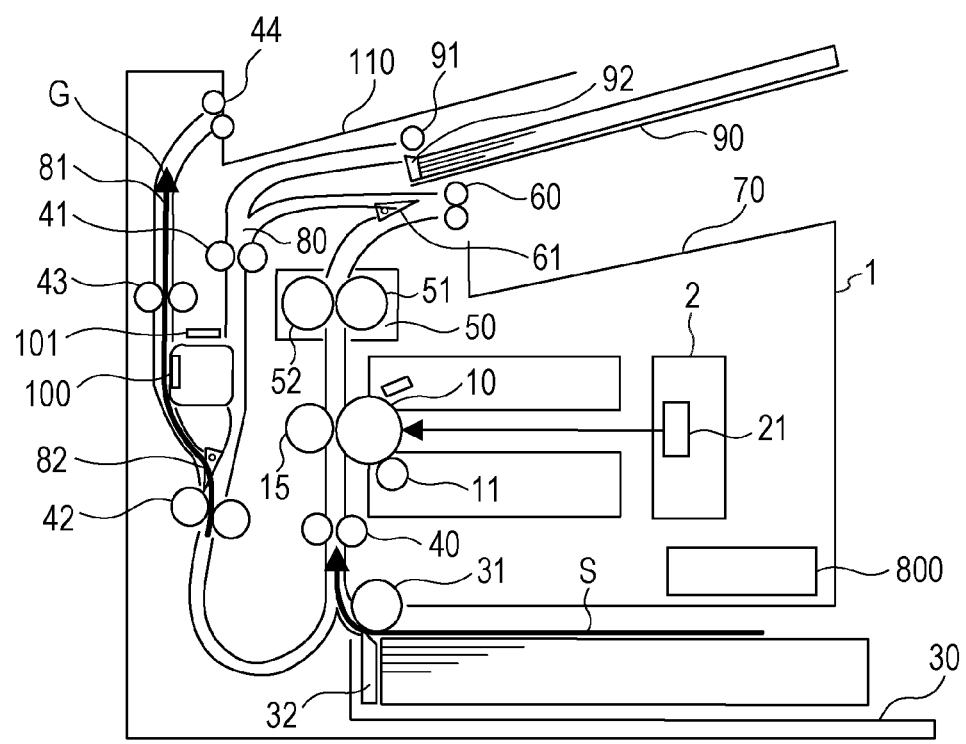
FIG. 5 is a cross-sectional view illustrating the configuration of the printing apparatus.

As illustrated in FIG. 5, when reading of the second surface, which is a back surface of the original, is started, the switchback flapper 82 switches the sheet conveying path from the sheet conveying path 80 to the sheet conveying path 81. At the same time, the image reader 100 rotates to a position at which the image reader 100 faces the sheet conveying path 81. If the conveying rollers 42 rotate in the reverse direction, the original G is conveyed to the image reader 100 along the sheet conveying path 81. When the original G is conveyed to the image reader 100 and passes through the image reader 100, the information on the second surface, which is the back surface of the original, is read out and is stored in the image memory 804 as the information regarding the second surface of the original.

The sheets S supplied from the first paper feeding unit 30 is conveyed to the conveying rollers 40 one by one. At substantially the same time, a latent image is formed on the photoconductive drum 10 on the basis of image information generated by the light emitting unit 21 on the basis of the information regarding the second surface, which is a back surface of the original, stored in the image memory 804. Subsequently, in the transfer unit 15, the sheet S has a toner image formed from the latent image and transferred thereto. Thereafter, the sheet S is conveyed to the fixing unit 50. In this manner, image formation of the second surface of the original is completed. Note that in FIG. 5, when reading of the information regarding the second surface, which is the back surface of the original is started, supply of the sheet S is started. However, after the information regarding the second surface is read out, the sheet S may be conveyed.

Figure 6:
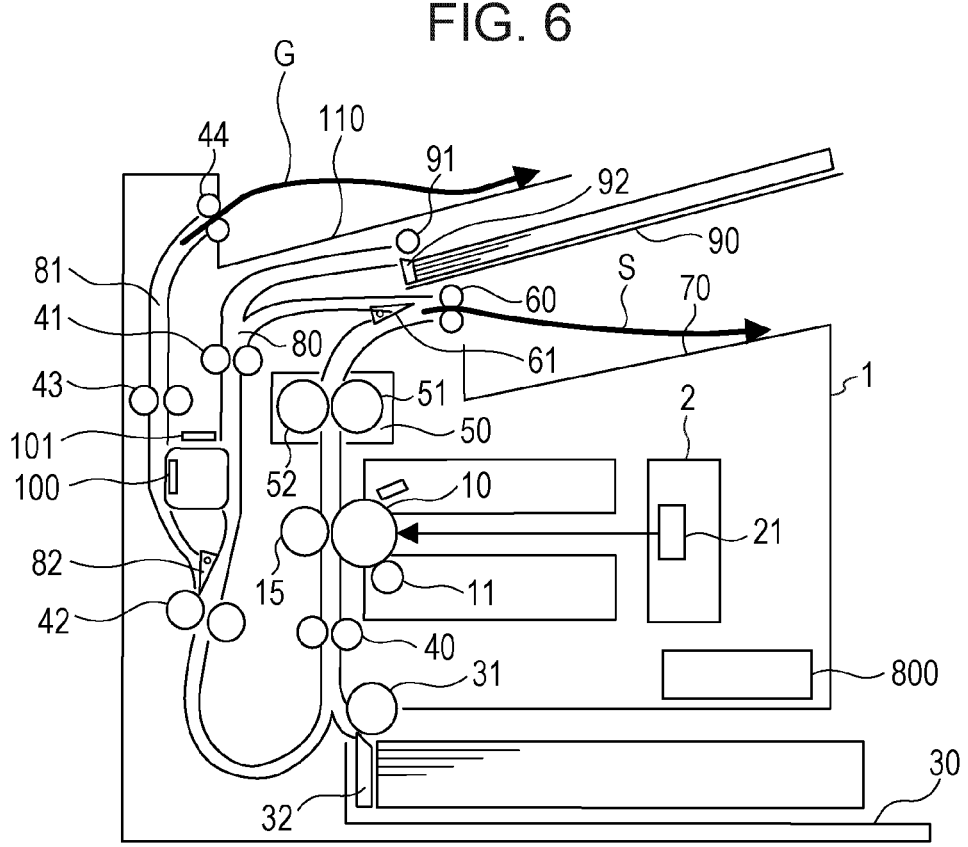
FIG. 6 is a cross-sectional view illustrating the configuration of the printing apparatus.

As illustrated in FIG. 6, when reading of the back surface of the original is completed, the original G whose image has been read out is conveyed to conveying rollers 43 and conveying rollers 44 and is stacked on the first paper output tray 110. If the trailing edge of the original G passes beyond the switchback flapper 82, the switchback flapper 82 switches the sheet conveying path from the sheet conveying path 81 to the sheet conveying path 80 so that the sheet S is conveyed in a direction toward the conveying rollers 40. The sheet S having the image of the second surface of the original formed thereon is conveyed to the sheet conveying path 80 switched by the duplex flapper 61 by the reverse rotation of the discharge rollers 60.

Figure 7:
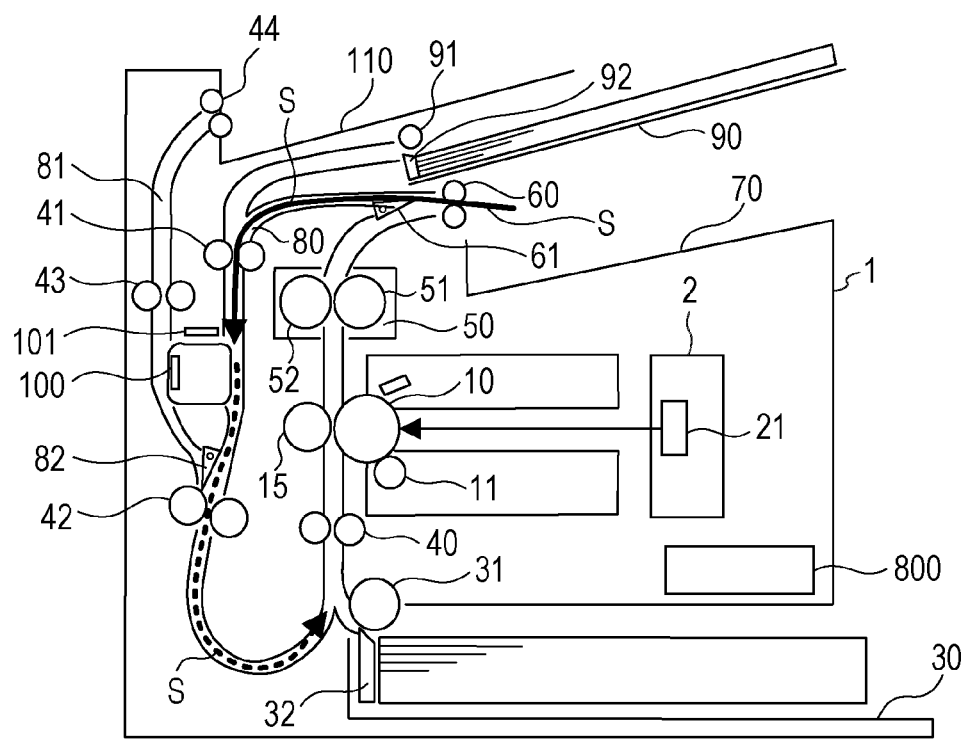
FIG. 7 is a cross-sectional view illustrating the configuration of the printing apparatus.

As illustrated in FIG. 7, when image formation on the sheet S is completed, the sheet S conveyed to the sheet conveying path 80 passes through the image reader 100 that is turned over. Thereafter, the sheet S is conveyed to the conveying rollers 40 via the conveying rollers 42. The sheet S is further conveyed to the transfer unit 15 again, as indicated by the sheet S illustrated using a dashed line. Subsequently, a toner image based on the image information regarding the first surface of the original stored in the image memory 804 is transferred and fixed to the sheet S using the optical unit 2, the photoconductive drum 10, the developing roller 11, the transfer unit 15, and the fixing unit 50. Thereafter, the sheet S is stacked on the second paper output tray 70.

The above description has been made with reference to the case in which the original sheets and the print sheets are output to different output trays. Control performed to output the original sheets and print sheets to the same destination tray according to the present exemplary embodiment is described in detail below.

Control Performed to Output Original Sheets and Print Sheets to Same Destination Tray According to the present exemplary embodiment, control is performed so that the original G is conveyed through the shared sheet conveying path and, thereafter, is conveyed to the transfer unit 15 by the conveying rollers 40. At that time, the need for transfer and fixing of a toner image by an image forming unit may be eliminated. A process to read out the image of the original G and print the image on a print sheet is described below.

An original reading process is performed as described above with reference to FIGS. 3 and 4. The original G is conveyed to the conveying rollers 42 and the conveying rollers 40 and is conveyed to the transfer unit 15. If an image is formed on the original G, a latent image is formed on the photoconductive drum 10 by the light emitting unit 21 on the basis of the image information stored in the image memory 804. Thereafter, in the transfer unit 15, the toner image formed from the latent image is transferred onto the original G. Subsequently, the original G is conveyed to the fixing unit 50 (and other units) and is stacked on the second paper output tray 70.

However, if an image is not formed on the original G, the above-described transfer and fixing of the toner image are not performed by the image forming unit, and the original G is stacked on the second paper output tray 70 by the discharge rollers 60.

Thereafter, when the trailing edge of the original G passes beyond the conveying rollers 40, the sheets fed from the first paper feeding unit 30 is conveyed to the conveying rollers 40 one by one. At substantially the same time, a latent image is formed on the photoconductive drum 10 by the light emitting unit 21 on the basis of the image information regarding the first surface, which is the front surface of the original, stored in the image memory 804.

Subsequently, in the transfer unit 15, a toner image formed from the latent image is transferred onto the sheet, which is conveyed to the fixing unit 50 (and other units) and is stacked on the second paper output tray 70. Note that if the image formed on the original G is also formed on the sheet, an image can be formed on the basis of image information generated by overlaying the information regarding the first surface, which is the front surface of the original, stored in the image memory 804 onto the image information formed on the original G.

Figure 8:
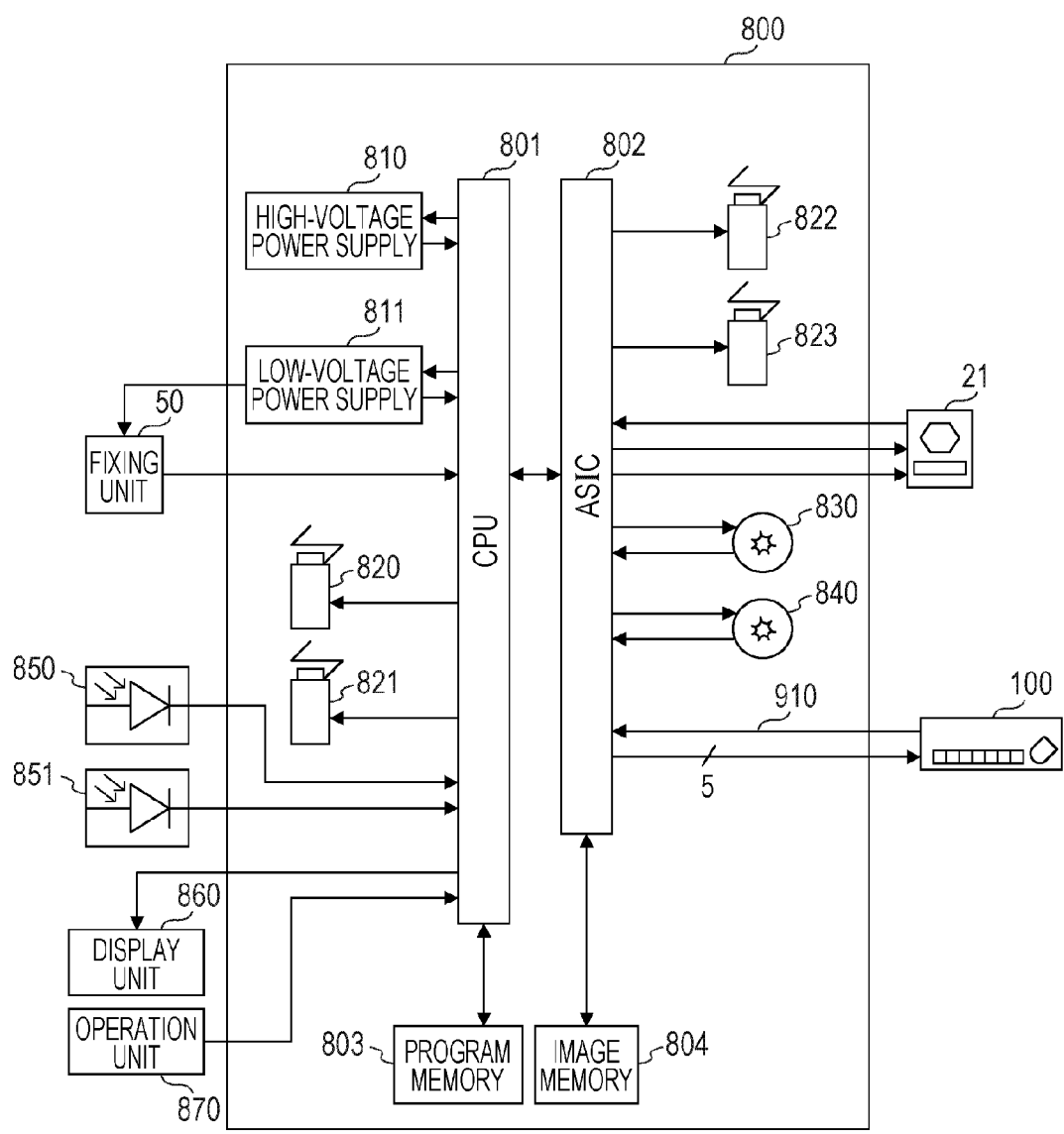
FIG. 8 is a block diagram illustrating the control structure of the printing apparatus.

FIG. 8 is a block diagram of the control structure of the printing apparatus 1 illustrated in FIG. 1 and other drawings.

An example of the control unit 800 including a control central processing unit (control CPU) 801 is described in this example. The image forming operation performed by the control CPU 801 and the operation performed by an application specific integrated circuit (ASIC) 802 of the printing apparatus 1 according to the first exemplary embodiment of the present invention are described below with reference to FIG. 8.

As illustrated in FIG. 8, the control CPU 801 is connected to the light emitting unit 21 via the ASIC 802. The light emitting unit 21 includes a polygon mirror, a motor, and a laser beam emitting device. To form a desired latent image by scanning a laser beam over the surface of the photoconductive drum 10, the control CPU 801 outputs a control signal to the ASIC 802. Thus, the control CPU 801 controls the optical unit 2. Similarly, to convey the sheet S, the control CPU 801 controls a main motor 830 which drives the pickup roller 31, the conveying rollers 40, the photoconductive drum 10, the transfer unit 15, the heat pressure roller 51, and the heat pressure roller 52. In addition, the control CPU 801 controls a sheet feeding solenoid 822 that is turned on when driving of the feeding roller for feeding the sheet S is started and that drives the pickup roller 31. Furthermore, the control CPU 801 controls a drive system of, for example, a drive motor 840 that drives the pickup roller 91 and the conveying rollers 41 to 44.

Still furthermore, the control CPU 801 controls a high-voltage power supply 810, the fixing unit 50, and a low-voltage power supply 811. The high-voltage power supply 810 controls a primary charge bias, a development bias, a primary transfer bias, and a secondary transfer bias that are required for the electrophotographic process. Yet still furthermore, the control CPU 801 monitors a fixing temperature using a thermistor (not illustrated) disposed in the fixing unit 50 and controls the fixing temperature at a constant level.

In addition, the control CPU 801 is connected to a program memory 803 via, for example, a bus (not illustrated). The program memory 803 stores programs and data used by the control CPU 801 to perform the above-described control and all or part of the processing described in the above-described exemplary embodiments of the present invention. That is, the control CPU 801 performs the operations of the exemplary embodiments of the present invention using the programs and data stored in the program memory 803.

The ASIC 802 controls the speed of the motor disposed in the light emitting unit 21 and the speeds of the main motor 830 and the drive motor 840 in accordance with an instruction received from the control CPU 801. The speeds of the motors are controlled by detecting a tach signal from a motor (not illustrated) (a pulse signal output from a motor for each revolution of a motor shaft) and outputting an acceleration signal or a deceleration signal to the motor so that the interval between the tach signals is a predetermined time interval. By configuring the control circuit as a circuit formed from the hardware of the ASIC 802, the control load imposed on the control CPU 801 can be advantageously reduced.

Upon receiving a print command output from a host computer (not illustrated) or a print command received through the operation unit 870, the control CPU 801 drives the main motor 830, the drive motor 840, and the sheet feeding solenoid 822 to convey the sheet S.

After a toner image formed on the surface of the photoconductive drum 10 is transferred onto the sheet S by the transfer unit 15, the toner image is fixed to the sheet S by the fixing unit 50. Thereafter, the sheet S is output onto the second paper output tray 70 by the discharge rollers 60. To more accurately align the edges of the sheets having images formed thereon, the second paper output tray 70 gradually slopes upward from a point near a sheet output port in a sheet output direction. At that point, the control CPU 801 provides predetermined electric power to the fixing unit 50 via the low-voltage power supply 811 to generate a predetermined amount of heat, which is provided to the sheet S. Thus, the toner image on the sheet S is fused and fixed to the sheet S.

The original reading operation according to the present exemplary embodiment is described next.

Upon receiving a scan command from a host computer (not illustrated) or a scan command through the operation unit 870, the control CPU 801 drives a duplex flapper solenoid 820 and the drive motor 840 to operate an original feeding solenoid 823. In this manner, the control CPU 801 transfers the torque of the drive motor 840 to the pickup roller 91 and conveys the original G. In addition, the image reader 100 is connected to the ASIC 802. The control CPU 801 stores, in the image memory 804 connected to the ASIC 802, the image that is read from the image reader 100 via the ASIC 802 through a variety of control processes.

Subsequently, the control CPU 801 operates a switchback solenoid 821 to tilt the switchback flapper 82 to the sheet conveying path 81, rotates the drive motor 840 in the reverse direction, and convey the original G to the first paper output tray 110. Note that the control CPU 801 may drive the conveying rollers 40 via the drive motor 840 without operating the switchback solenoid 821 in the above-described manner and convey the original G to the transfer unit 15. In addition, upon receiving a copy command sent from the operation unit 870, the control CPU 801 performs control so that the above-described original reading operation is combined with the above-described print operation and is performed.

The control CPU 801 instructs the display unit 860 to display a copy setting screen. Note that the display unit 860 includes a light emitting diode (LED) and a liquid crystal display. The display unit 860 displays the information regarding the operation performed by an operator or the internal status of the apparatus. The operation unit 870 receives an operation performed by an operator. Instead of including a plurality of operation buttons, the operation unit 870 may be formed as a touch display of the display unit 860.

Figure 9:
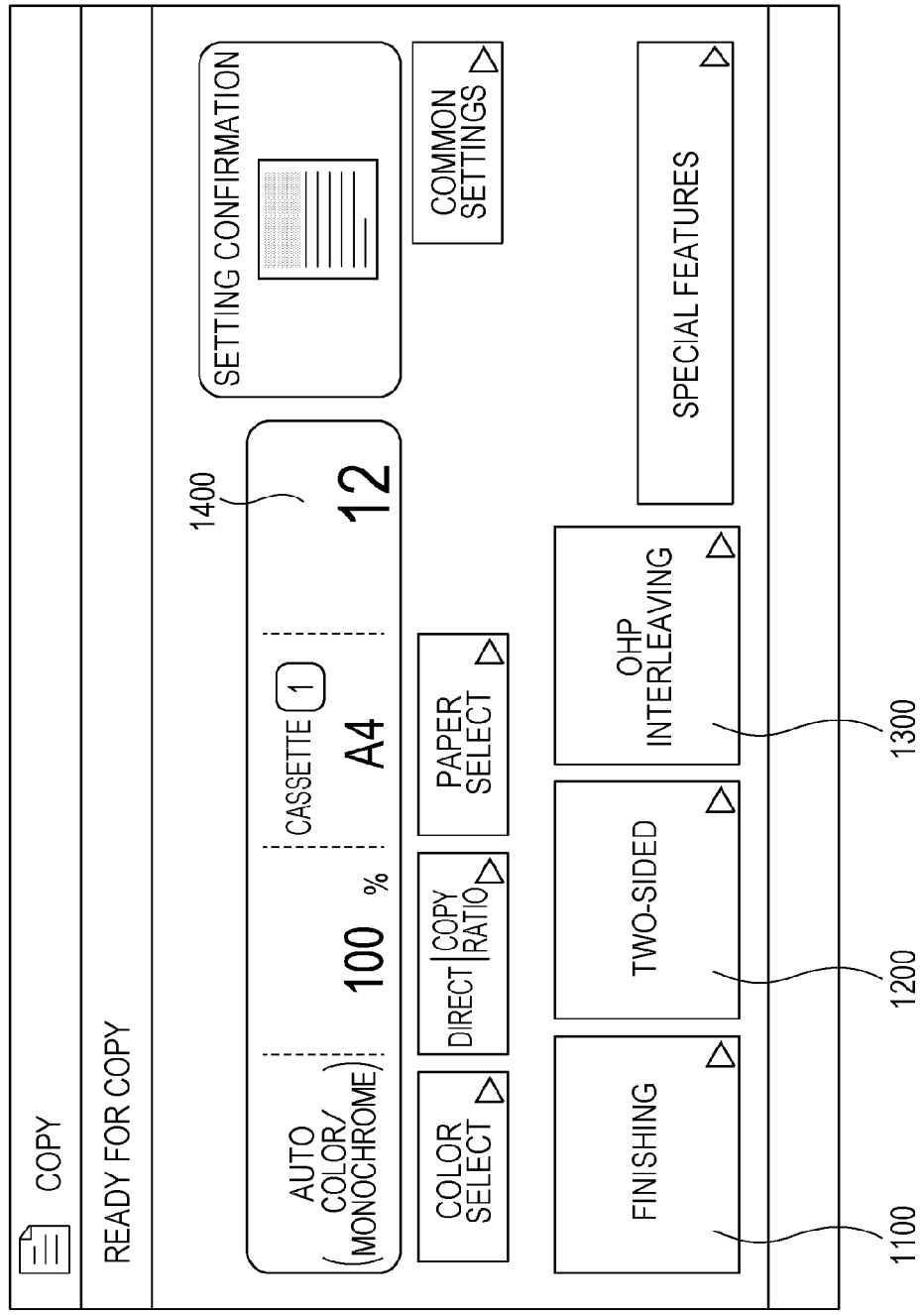
FIG. 9 illustrates an example of a copy setting screen displayed on a display unit.

FIGS. 9 to 12 illustrate an example of copy setting screens displayed on the display unit 860 illustrated in FIG. 8. FIG. 9 illustrates an example of a top screen used by a user to set up the copy feature. The top screen contains a finishing button 1100, a 2-sided button 1200, an OHP interleave button 1300, and a display area 1400 used for displaying the number of copies.

The operation unit 870 receives a user operation. The display unit 860 changes part of the information displayed on the screen in accordance with the received operation. Alternatively, the display unit 860 performs control so that another screen is displayed in accordance with the received operation. FIG. 9 illustrates an example of a screen after the number of copies is set to 12 by the user operation. In addition, if the 2-sided button 1200 is pressed, the control CPU 801 displays a screen for original duplex reading settings and duplex printing settings. In addition, if the finishing button 1100 is pressed, the control CPU 801 displays a screen illustrated in FIG. 10. If the OHP interleave button 1300 is pressed, the control CPU 801 displays a screen illustrated in FIG. 12.

Figure 10:
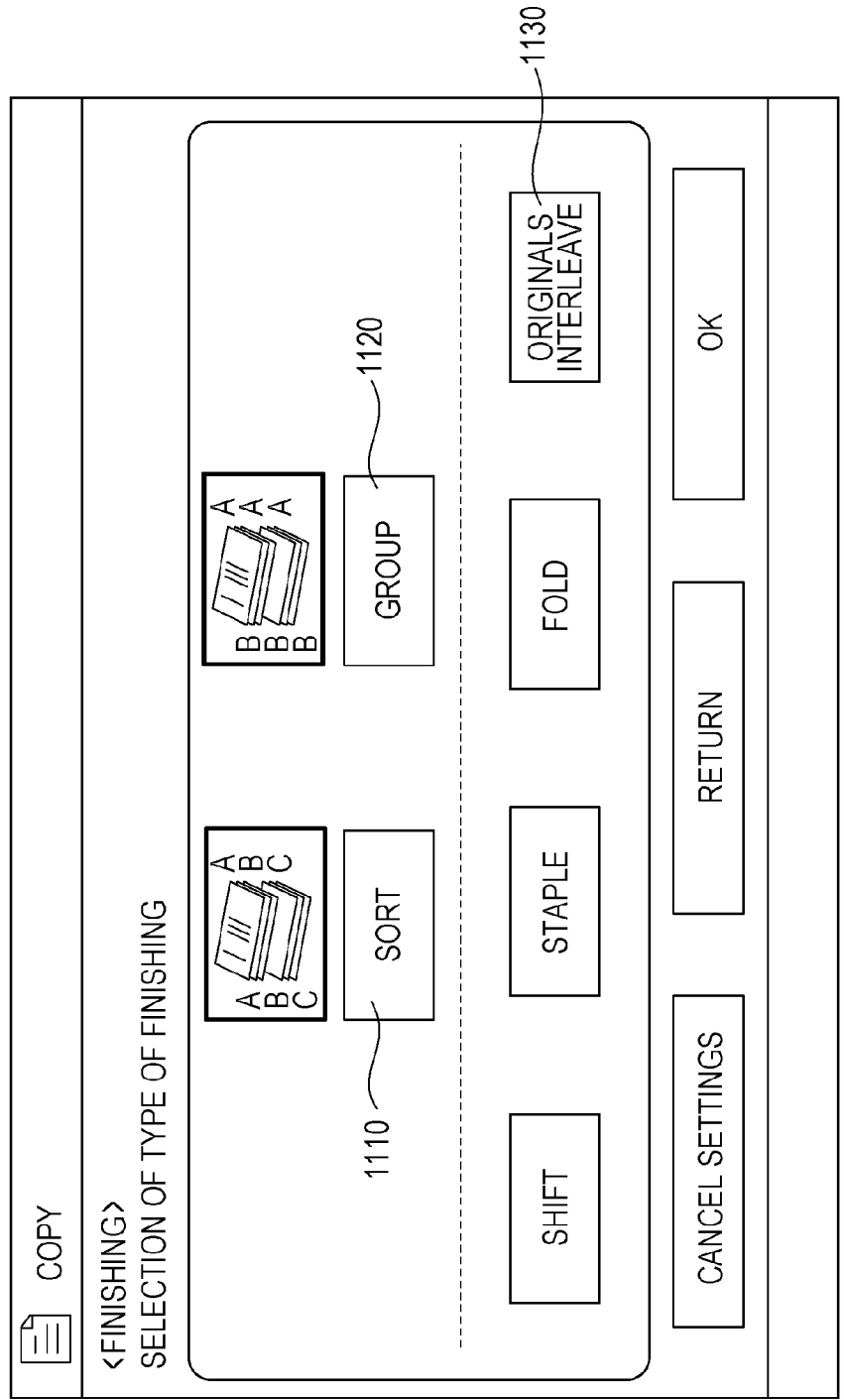
FIG. 10 illustrates an example of a copy setting screen displayed on the display unit.

FIG. 10 illustrates an example of a finishing setting screen used to set up the type of finishing. In the finishing setting screen, a sort button 1110 and a group button 1120 are displayed. The sort button 1110 is used to enable a sort feature. The sort feature allows an operation to print a plurality of sheets sorted into a set that is arranged in page order and repeat the operation for the specified number of copies. In contrast, the group button 1120 is used to turn on the group feature. If the group feature is turned on, a single page is printed a number of times equal to the specified number of copies. Thereafter, an operation to print the next page a number of times equal to the specified number of copies is repeated until the last page is printed. The sort feature and the group feature are exclusive to each other. Accordingly, the control CPU 801 performs control so that both the features are not enabled at the same time. Furthermore, the finishing setting screen contains an original interleave button 1130 used to determine whether the original and the sheet are output together to the same paper ejecting unit.

Figure 11:
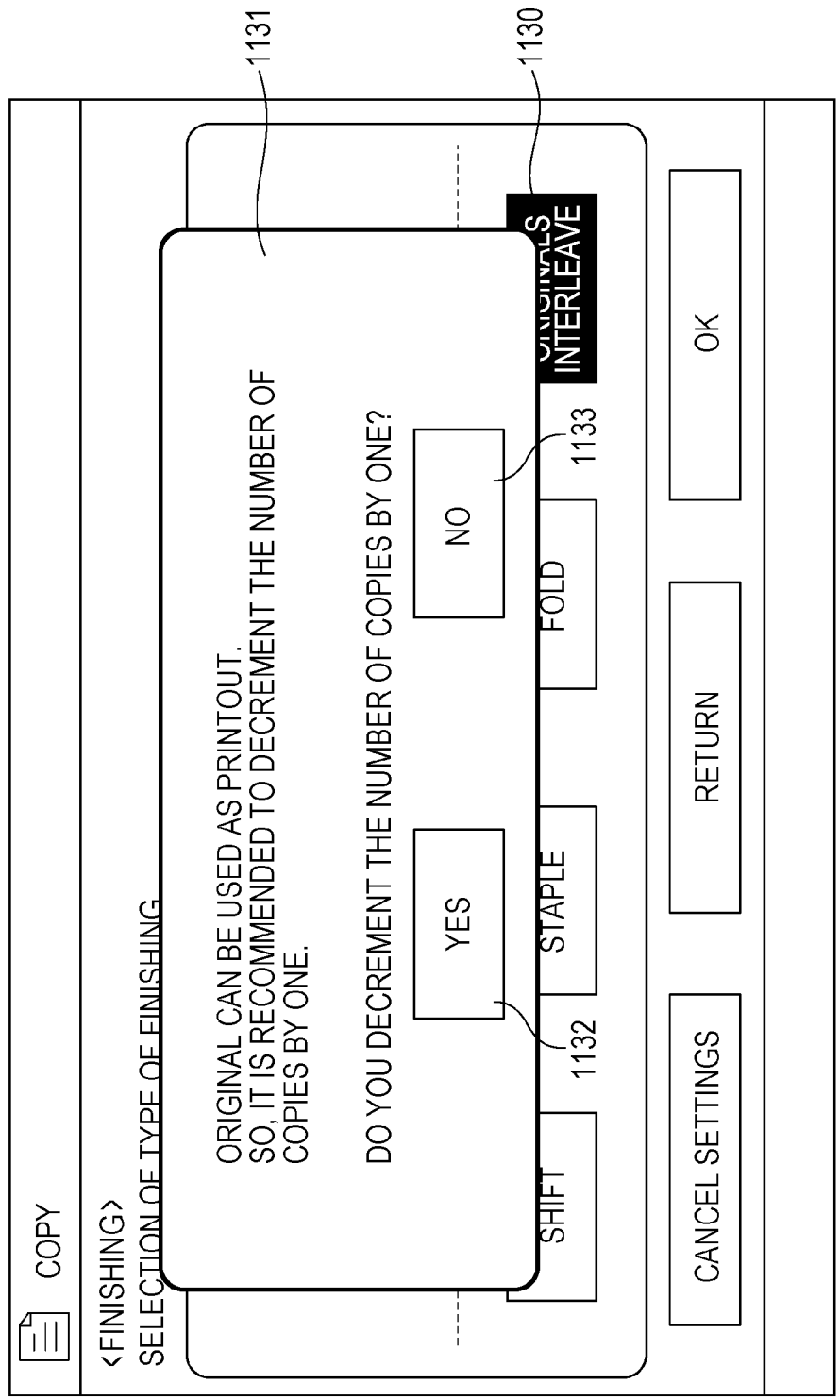
FIG. 11 illustrates an example of a copy setting screen displayed on the display unit.

Note that if by pressing the original interleave button 1130, setting is made so that the original and the sheet are output together to the same paper ejecting unit, a warning screen 1131 may be displayed to inform the user of that information, as illustrated in FIG. 11.

The warning screen 1131 is displayed when the number of output copies displayed in the display area 1400 is 2 or greater. The warning screen 1131 contains a button 1132 for subtracting one from the preset number of output copies and a button 1133 for causing the preset number of output copies to remain unchanged. If the button 1132 is pressed, the control CPU 801 performs control so that the number of copies displayed in the display area 1400 is changed to a value obtained by decrementing the number of copies by one.

Figure 12:
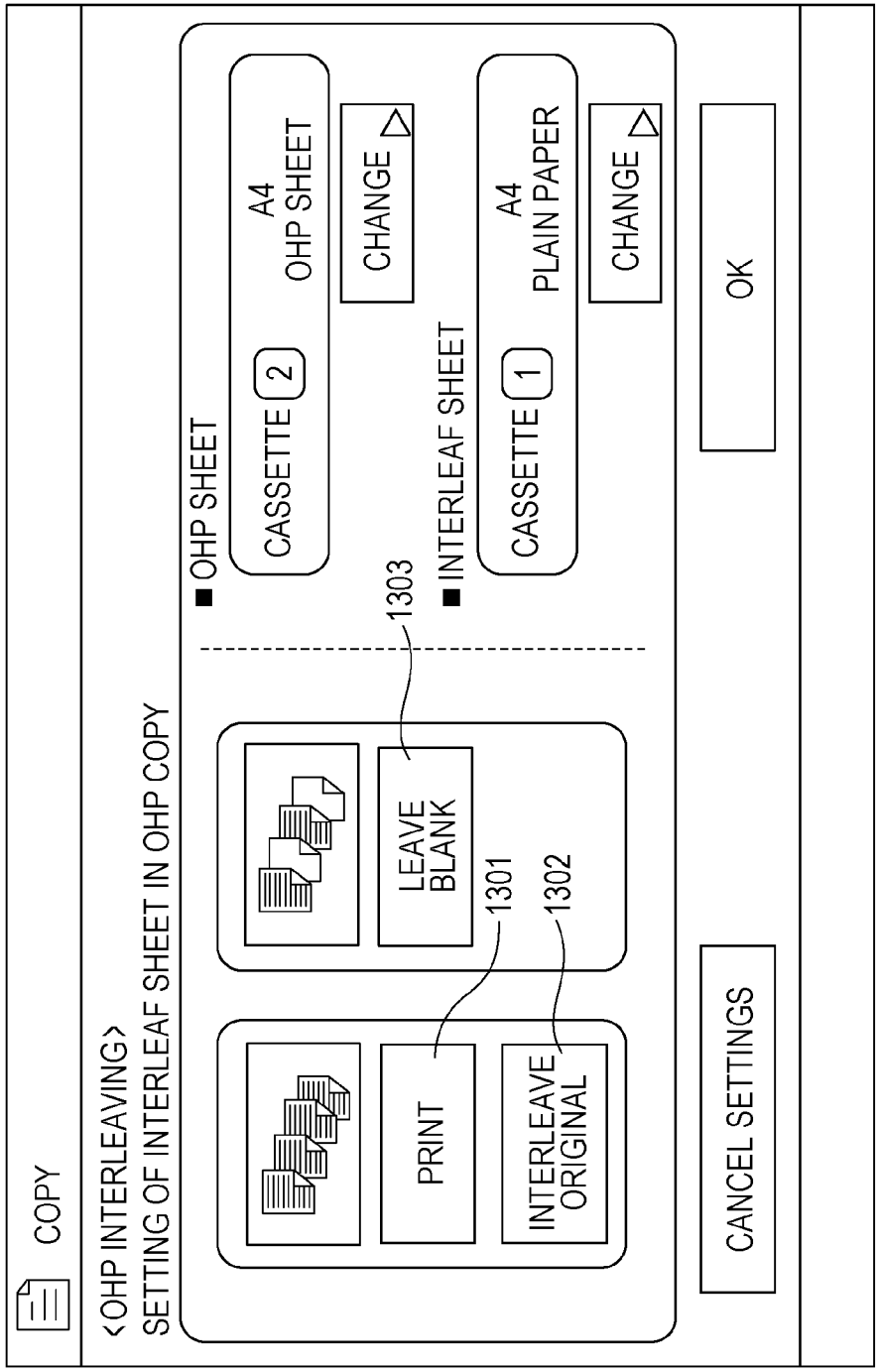
FIG. 12 illustrates an example of a copy setting screen displayed on the display unit.

FIG. 12 illustrates an example of an OHP interleave setting screen for setting the OHP interleave feature.

The OHP interleave setting screen contains a button 1301 used to set so that the readout original image is printed on interleave paper, a button 1302 used to set so that the original is directly inserted as interleave paper, and a button 1303 used to set so that the readout original image is not printed on the interleave paper. If the button 1302 is pressed in order to directly insert the original as the interleave paper, the control CPU 801 performs control so that the setting made by the original interleave button 1130 is disabled.

Figure 13:
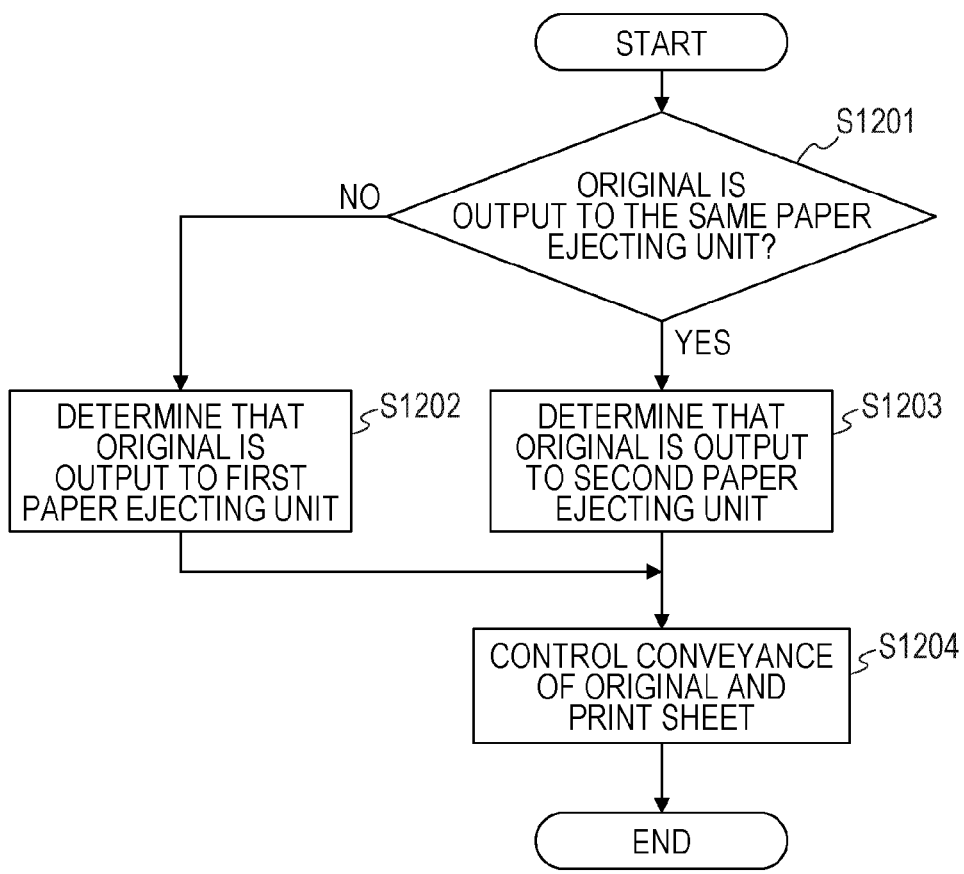
FIG. 13 is a flowchart of a method for controlling a printing apparatus.

FIG. 13 is a flowchart illustrating a method for controlling a printing apparatus according to the present exemplary embodiment. In this example, an example of an original reading process performed upon receiving a copy command sent from the operation unit 870 is described. Note that a control program corresponding to each of steps is stored in the program memory 803. By the control CPU 801 executing the control program, the original reading process is performed. Note that if the destination of the sheet S can be switched as needed, a step for determining the destination of the sheet S is required prior to step S1201.

Immediately after the original reading process is started, it is determined whether the original G and the sheet S are to be output together to the same paper ejecting unit on the basis of the setting information set up by the original interleave button 1130 and the button 1302 (S1201). If the settings made using the original interleave button 1130 or the button 1302 are enabled, it is determined that the destination of the original G is the second paper output tray 70 (S1203). In this manner, the destination of the original G is set so as to be the same as the destination of the sheet S. However, if both the original interleave button 1130 and the button 1302 are not enabled, it is determined that the destination of the original G is the first paper output tray 110 (S1202). In this manner, the destination of the original G is set so as to be a destination that differs from the destination of the sheet S. Thereafter, in step S1204, the control CPU 801 performs control of the original reading process described above and performs conveyance control to output the original G to the destination determined in step S1202 or S1203. Thereafter, the processing is completed.

Figure 14:
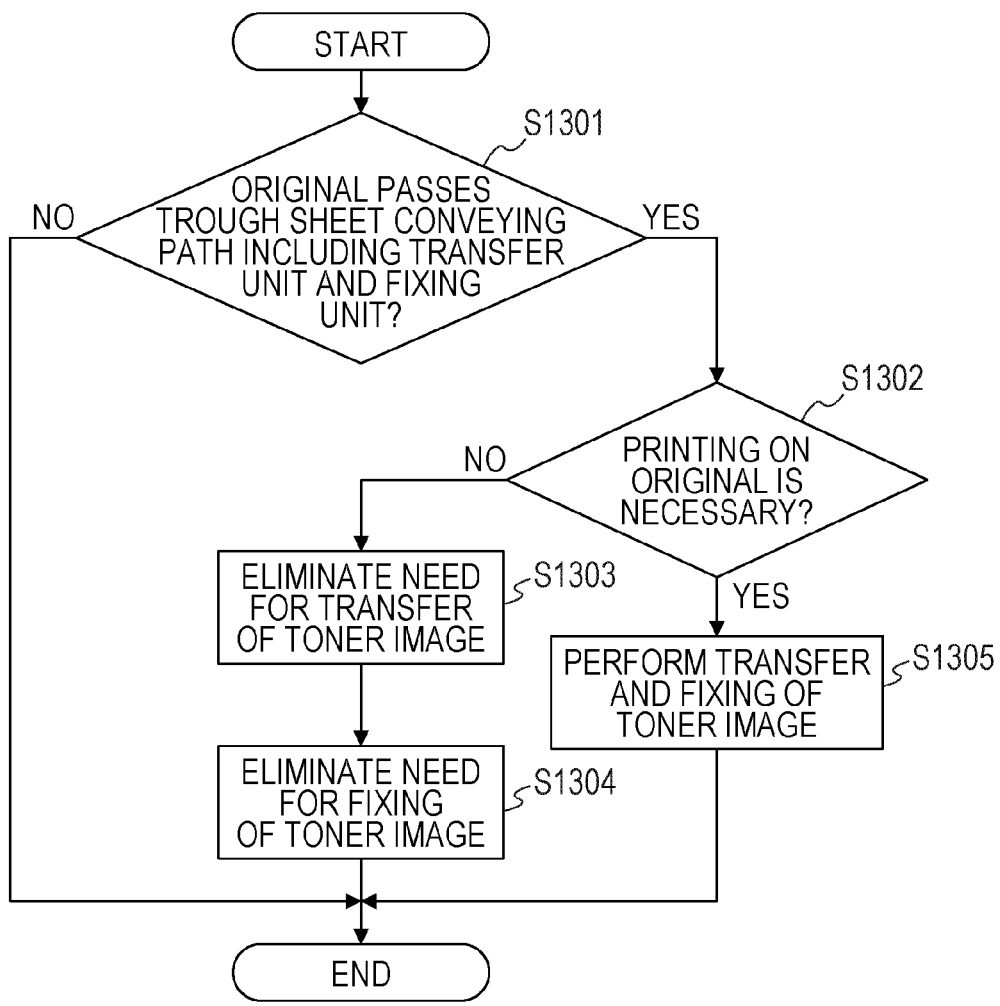
FIG. 14 is a flowchart of the method for controlling a printing apparatus.

FIG. 14 is a flowchart illustrating a method for controlling a printing apparatus according to the present exemplary embodiment. In this example, a process is described when the destination of the sheet S is fixed to the second paper output tray 70. The control program corresponding to each step is stored in the program memory 803, and the method is realized by the control CPU 801 executing the control programs. An example of paper output control performed by the image forming unit is described below. Under the control, the image forming conditions are changed, and the original is conveyed and is output.

Upon controlling conveyance of the original G to the destination determined in step S1202 or S1203, the control CPU 801 determines whether the original G passes through the sheet conveying path including the transfer unit 15 and the fixing unit 50 first (S1301). At that time, if the control CPU 801 determines that the destination of the original G determined in step S1202 or S1203 is the second paper output tray 70, the control CPU 801 further determines that the original G passes through the sheet conveying path including the transfer unit 15 and the fixing unit 50.

However, if the control CPU 801 determines that the destination of the original G is the first paper output tray 110, the control CPU 801 determines that the original G does not pass through the sheet conveying path including the transfer unit 15 and the fixing unit 50. If the original G does not pass through the sheet conveying path including the transfer unit 15 and the fixing unit 50, the need for drive control of the transfer unit 15 and the fixing unit 50 for the original G can be eliminated.

Accordingly, if the original G passes through the sheet conveying path including the transfer unit 15 and the fixing unit 50, the control CPU 801 determines whether printing on the original G is necessary (S1302). At that time, if the control CPU 801 determines that settings that cause an additional image to be overlaid on the readout original image and settings that causes the additional image to be printed on the original G are made through the operation unit 870, a printing operation performed on the original G is needed.

At that time, the control CPU 801 drives the transfer unit 15 in unison with the conveyance of the original G to the transfer unit 15 to transfer the above-described additional image onto the original G. In addition, by driving the fixing unit 50 in unison with the conveyance of the original G to the fixing unit 50, image formation is performed (S1305). Thereafter, the processing is completed.

However, if the control CPU 801 determines that printing is not performed on the original G, the control CPU 801 does not drive the transfer unit 15 and the fixing unit 50 in unison with the conveyance of the original G (S1303 and S1304). In this manner, the original G is output onto the second paper output tray 70 without image formation on the original G. Thereafter, the processing is completed.

Note that if image formation is not performed on the original G, the control CPU 801 may drive the main motor 830 to perform control so that the heat pressure roller 51 is separated from the heat pressure roller 52 or the pressure between the heat pressure roller 51 and the heat pressure roller 52 is decreased.

In addition, if image formation is not performed on the original G, the control CPU 801 may perform control to decrease the fixing temperature of the fixing unit 50 by stopping or decreasing the electric power supplied via the low-voltage power supply 811.

Furthermore, if the pressure between the heat pressure roller 51 and the heat pressure roller 52 is decreased or the fixing temperature of the fixing unit 50 is decreased, the control CPU 801 may determine an amount of decrease in the pressure and an amount of decrease in the fixing temperature in accordance with the characteristics of the readout image of the original G. Still furthermore, the amount of decrease in the pressure and the amount of decrease in the fixing temperature may be determined in accordance with the number of conveyances of the original G through the sheet conveying path including the transfer unit 15 and the fixing unit 50.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-013958 filed Jan. 29, 2014, which is hereby incorporated by reference herein in its entirety.

What is claimed is:

1. A printing apparatus for reading out an image of an original and printing the readout image on print paper, the printing apparatus comprising:
    a setting unit implemented by at least one processor and configured to set whether the original is output to a paper ejecting unit for the print paper; and
    a control unit configured to perform control,
    wherein, if setting that causes the original to be output to a first paper ejecting unit that is the same as the paper ejecting unit for the print paper is made by the setting unit, the control unit is configured to perform control so that the original is output to the paper ejecting unit for the print paper,
    wherein, if setting that causes the original to be output to a paper ejecting unit that is the same as the paper ejecting unit for the print paper is not made by the setting unit, the control unit is configured to perform control so that the original is output to a second paper ejecting unit that differs from the paper ejecting unit for the print paper.

2. The printing apparatus according to claim 1, wherein, when reading out images of a plurality of the originals and printing the readout images of the originals on print paper, the control unit performs control of outputting the originals so that each of the originals is on top of the print paper having the image of the original printed thereon.

3. The printing apparatus according to claim 1, further comprising a printing unit configured to print an image on the original.

4. The printing apparatus according to claim 1, wherein, if setting that causes the original to be output to the first paper ejecting unit that is the same as the paper ejecting unit for the print paper is made by the setting unit, the control unit performs control so that a number of copies to be printed is changed.

5. A method for controlling a printing apparatus for reading out an image of an original and printing the readout image on print paper, the method comprising:
    setting, using at least one processor, whether the original is output to a paper ejecting unit for the print paper; and
    performing control,
    wherein, if setting that causes the original to be output to a first paper ejecting unit that is the same as the paper ejecting unit for the print paper is made by the setting, performing control includes performing control so that the original is output to the paper ejecting unit for the print paper,
    wherein, if setting that causes the original to be output to a paper ejecting unit that is the same as the paper ejecting unit for the print paper is not made by the setting, performing control includes performing control so that the original is output to a second paper ejecting unit that differs from the paper ejecting unit for the print paper.

6. The method according to claim 5, wherein, when reading out images of a plurality of the originals and printing the readout images of the originals on print paper, performing control includes performing control of outputting the originals so that each of the originals is on top of the print paper having the image of the original printed thereon.

7. The method according to claim 5, further comprising printing an image on the original.

8. The method according to claim 5, wherein, if setting that causes the original to be output to the first paper ejecting unit that is the same as the paper ejecting unit for the print paper is made by the setting, performing control includes performing control so that a number of copies to be printed is changed.

9. A non-transitory computer readable storage medium storing a computer readable program to cause a computer to perform a method for controlling a printing apparatus for reading out an image of an original and printing the readout image on print paper, the method comprising:

setting, using at least one processor, whether the original is output to a paper ejecting unit for the print paper; and performing control, wherein, if setting that causes the original to be output to a first paper ejecting unit that is the same as the paper ejecting unit for the print paper is made by the setting, performing control includes performing control so that the original is output to the paper ejecting unit for the print paper, wherein, if setting that causes the original to be output to a paper ejecting unit that is the same as the paper ejecting unit for the print paper is not made by the setting, performing control includes performing control so that the original is output to a second paper ejecting unit that differs from the paper ejecting unit for the print paper.

10. The non-transitory computer readable storage medium according to claim 9, wherein, when reading out images of a plurality of the originals and printing the readout images of the originals on print paper, performing control includes performing control of outputting the originals so that each of the originals is on top of the print paper having the image of the original printed thereon.

11. The non-transitory computer readable storage medium according to claim 9, the method further comprising printing an image on the original.

12. The non-transitory computer readable storage medium according to claim 9, wherein, if setting that causes the original to be output to the first paper ejecting unit that is the same as the paper ejecting unit for the print paper is made by the setting, performing control includes performing control so that a number of copies to be printed is changed.

* * * * *